(12) United States Patent
Klotz et al.

(10) Patent No.: US 8,161,919 B2
(45) Date of Patent: Apr. 24, 2012

(54) VARIABLE VENT SYSTEM INTEGRATED INTO A VEHICLE FRONT END GRILL

(75) Inventors: Steven Henry Klotz, Commerce Township, MI (US); Joachim Juergen Gernot Klesing, Rochester Hills, MI (US); William E. Aumann, Oxford, MI (US); Thomas Murray, Columbiaville, MI (US)

(73) Assignee: Webasto AG, Stockdorf (DE)

( * ) Notice: Subject to any disclaimer, the term of this patent is extended or adjusted under 35 U.S.C. 154(b) by 715 days.

(21) Appl. No.: 12/330,208

(22) Filed: Dec. 8, 2008

(65) Prior Publication Data

US 2010/0139583 A1    Jun. 10, 2010

(51) Int. Cl.
  *F01P 7/02*    (2006.01)
(52) U.S. Cl. .................. 123/41.04; 180/68.1; 296/193.1
(58) Field of Classification Search .............. 123/41.04, 123/41.15, 41.7; 180/68.1–68.4, 68.6; 296/180.1, 296/193.1; 165/DIG. 93–DIG. 99
See application file for complete search history.

(56) References Cited

U.S. PATENT DOCUMENTS

| | | | | |
|---|---|---|---|---|
| 1,206,025 A | * | 11/1916 | Nuckles | ........................... 165/98 |
| 1,393,161 A | * | 10/1921 | Raleigh | ........................ 236/35.2 |
| 1,393,917 A | * | 10/1921 | Snell | ................................ 165/98 |
| RE19,728 E | * | 10/1935 | Dintilhac | ...................... 236/35.3 |
| 2,291,283 A | * | 7/1942 | Klein et al. | ................... 236/35.3 |
| 3,543,838 A | * | 12/1970 | White | .............................. 62/160 |
| 3,759,054 A | * | 9/1973 | Graber | ............................. 62/183 |
| 3,759,056 A | * | 9/1973 | Graber | ............................. 62/183 |
| 4,457,558 A | | 7/1984 | Ishikawa | |
| 5,732,666 A | | 3/1998 | Lee | |
| 6,142,108 A | * | 11/2000 | Blichmann | ................. 123/41.05 |
| 6,145,251 A | * | 11/2000 | Ricci | ............................... 49/82.1 |
| 6,854,544 B2 | * | 2/2005 | Vide | ............................. 180/68.6 |
| 7,325,864 B1 | * | 2/2008 | Echeverria | ................. 296/193.1 |
| 2008/0073920 A1 | | 3/2008 | Knauer | |

FOREIGN PATENT DOCUMENTS

DE    391 6907    12/1989

* cited by examiner

*Primary Examiner* — Noah Kamen
*Assistant Examiner* — Hung Q Nguyen
(74) *Attorney, Agent, or Firm* — Fitch Even Tabin & Flannery LLP

(57) ABSTRACT

A system for variable engine compartment ventilation in a slim and compact unit with components used in non-related industries. The system can have at least one bank of movable louvers rotatably mounted within a louver frame for guiding a flow of air into a vehicle engine compartment; a motor to rotate the louvers with a motor gear formed on an output shaft rotatably connected in parallel to at least one helix cable by a helix cable drive gear and a louver pinion gear integral with each louver engaging the helix cable along its length; and a control unit for operating the assembly of movable louvers in response to an output signal from a vehicle communication bus. The output signal of the vehicle communication bus can be in response to input from an engine coolant temperature sensor or a vehicle speed sensor.

11 Claims, 5 Drawing Sheets

# US 8,161,919 B2

VARIABLE VENT SYSTEM INTEGRATED INTO A VEHICLE FRONT END GRILL

CLAIM OF PRIORITY

None

FIELD OF THE INVENTION

The present invention generally relates to vehicle engine compartment ventilation and, particularly, to a system to provide variable engine compartment ventilation in a slim and compact unit.

BACKGROUND OF INVENTION

In the art, a grill is typically placed in the front of a vehicle to guide air to its radiator. In additional to its ventilation function, the grill can also provide protection to the radiator and give the vehicle a distinctive appearance. It can be desirable to vary air flow to the radiator and vehicle front end aerodynamics based on various factors, such as driving conditions and engine temperature. For example, under high speed driving conditions, a closed front end grill can reduce vehicle air resistance and thus improve vehicle fuel efficiency. Also, optimal warm-up and temperature control of an internal combustion engine can improve fuel efficiency, improve engine performance, reduce emissions, and prolong engine life. Varying front end grill engine ventilation can be a useful tool to assist in achieving optimal engine temperature in many situations, such as during engine warm-up, cold ambient temperatures, and the like.

Variable ventilation of a front end grill is known in the art. For example, U.S. Pat. No. 4,457,558 to Ishikawa describes a system having a louvered grill associated with an air spoiler that are controlled based on vehicle speed and engine temperature. As vehicle speed increases, the air spoiler is opened to provide ventilation to the engine. A thermostat controls the amount of the grill ventilation through the louvers, having as its natural state a closed position to reduce wind resistance. While this system is effective, it is fairly complicated, uses a fair amount of parts, and appears geared more toward high vehicle performance. Also related to wind resistance as a function of grill ventilation is DE3916907 to Volkswagen AG. This invention has a variable wind resistance that increases to maximum wind resistance during heavy braking to provide high wheel force to the front wheels during the braking.

Other art, such as US 2008/0073920 to Knauer, discloses a grill with at least one flow-through opening and an assembly movably positioned behind the grill and matched to the geometry of the flow-through openings of the grill. In situations where closure of the flow through opening(s) is desired, the entire assembly is moved forward to block air flow. While this provides a simple design, it is unclear how the strip elements are actuated towards the grill. In any event, the assembly would most likely require a significant amount of room between the grill and the radiator.

Louvered variable grills are also known in the art. For example, U.S. Pat. No. 5,732,666 to Lee describes a plurality of louvers (directional control fins) actuated by temperature control sensors. A motor with a worm gear drives a pinion connected to one of the louvers. This movement is translated to the remaining louvers via a link bar.

While this technology marks a great advance in the art, further advances are possible. For example, the drive motor only drives one louver and is mounted at right angles to the louvers. This creates a bulky arrangement, since the motor extends rearward toward the radiator. The present invention attempts to overcome these shortcomings in the art by providing a grill ventilation system that allows vertical placement of the motor while directly driving each of the louvers.

SUMMARY OF INVENTION

Accordingly, the present invention provides a grill ventilation system that allows vertical placement of the motor with active motive force to each louver. The present invention provides several advantages over the prior art in that it not only provides a solution to engine compartment ventilation in a slim and compact unit, but that it also is able to be manufactured with components used in non-related industries.

The present invention provides a variable venting system for a front end of a vehicle and can have at least one bank of movable louvers rotatably mounted within a louver frame for guiding a flow of air into a vehicle engine compartment; means for moving said louvers in opposite directions comprising a motor connected to a power supply having a motor gear formed on output shaft rotatably connected in parallel to at least one helix cable by a helix cable drive gear, and a louver pinion gear integral with each louver engaging the helix cable along its length, and a control unit for operating the assembly of movable louvers in response to an output signal from a vehicle communication bus such as a control area network (CAN) or a local interconnect network (LIN).

Additional features of the present invention can include a decorative grill attached forward of the assembly of movable louvers. Also, the output signal of the vehicle communication bus can be in response to input from an engine coolant temperature sensor or a vehicle speed sensor.

In a preferred embodiment, there are two banks of horizontally positioned movable louvers, each engaged to one of two helix cables, both helix cables driven in parallel by the motor gear.

Other features of the present invention will become more apparent to persons having ordinary skill in the art to which the present invention pertains from the following description and claims.

BRIEF DESCRIPTION OF THE FIGURES

The foregoing features, as well as other features, will become apparent with reference to the description and figure below, in which like numerals represent elements and in which.

DETAILED DESCRIPTION OF THE INVENTION

The present invention generally relates to vehicle engine compartment ventilation and, particularly, to a system to provide variable engine compartment ventilation in a slim and compact unit.

The present invention provides several advantages over the prior art in that it not only provides a solution to engine compartment ventilation in a slim and compact unit, but that it also is able to be manufactured with components used in non-related industries. This is especially the case for the embodiment in which the decorative grill portion is eliminated altogether.

Figure 4:
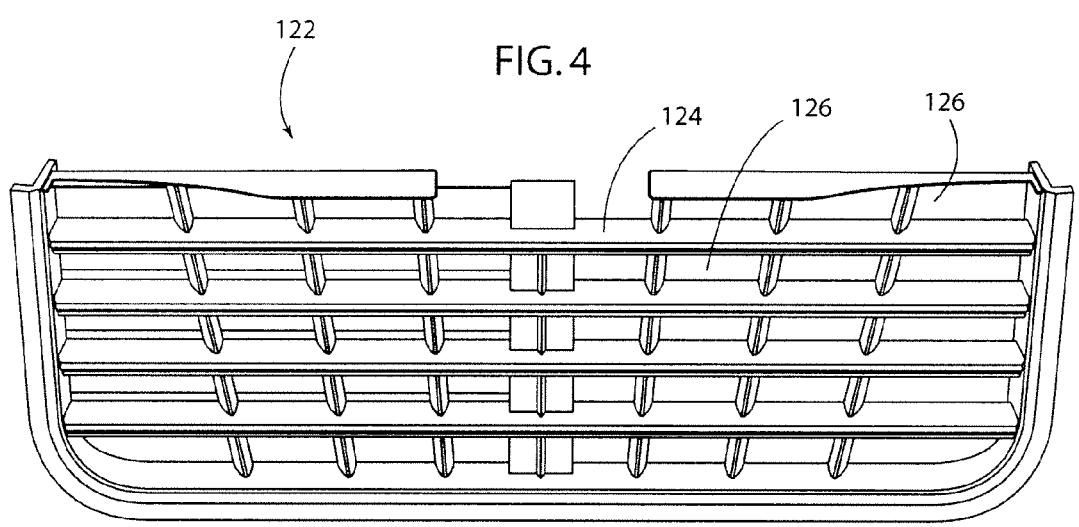
FIG. 4 illustrates a front end view of a prior art decorative vehicle front end grill.

Turning now to the figures, FIG. 4 shows a typical prior art front end grill (grill, radiator grill) generally indicated at 122. As shown, a typical grill has fixed louvers 124 and multiple openings 126 to allow air to flow past a radiator (not shown).

Figure 1:
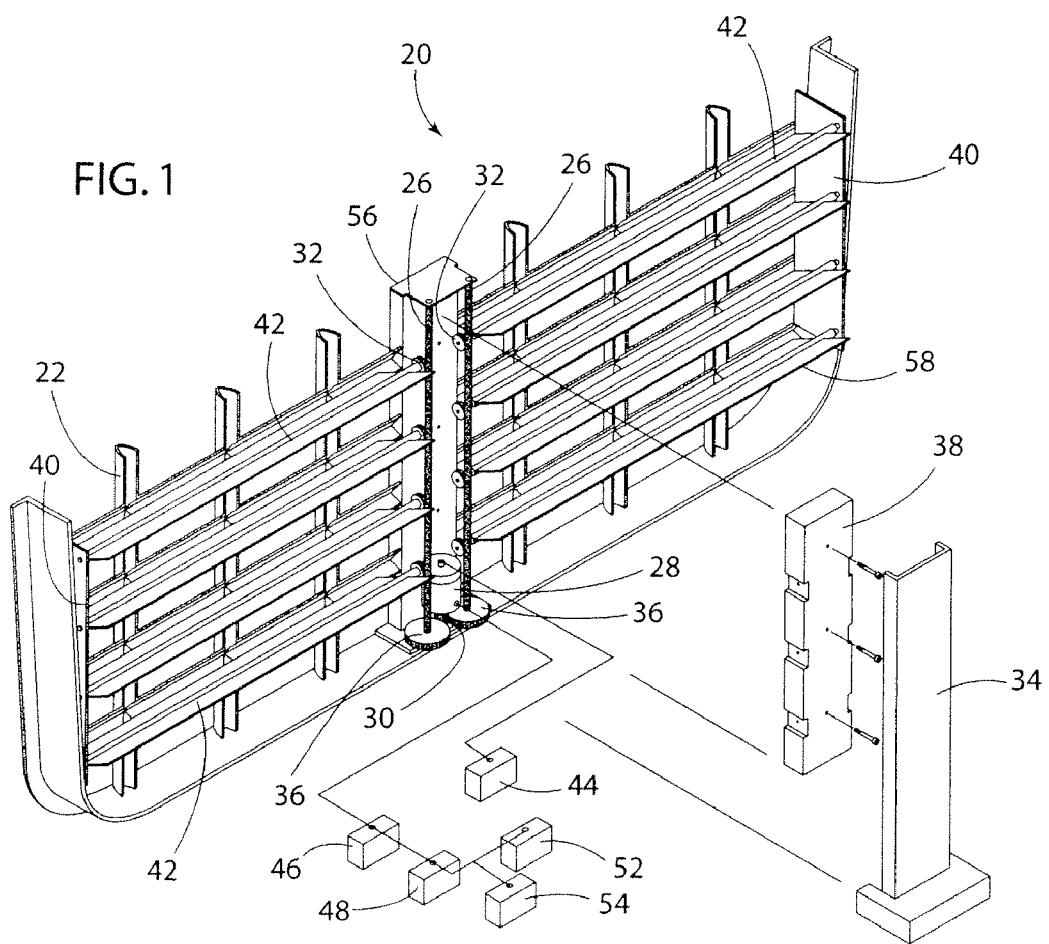
FIG. 1 illustrates an exploded rear perspective view of one embodiment of a variable vehicle grill ventilation system according to the present invention.
Figure 2:
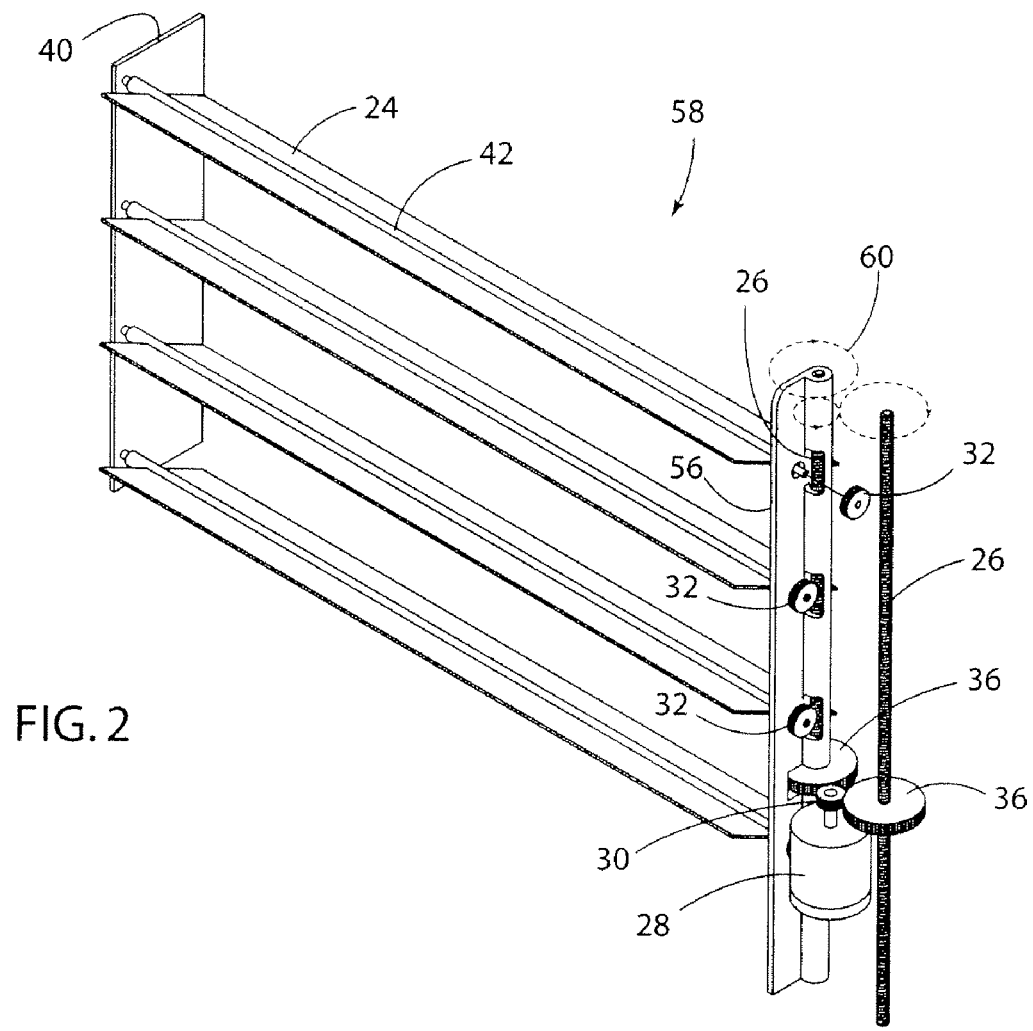
FIG. 2 illustrates a perspective view of one embodiment of a louver assembly according to the present invention.
Figure 3:
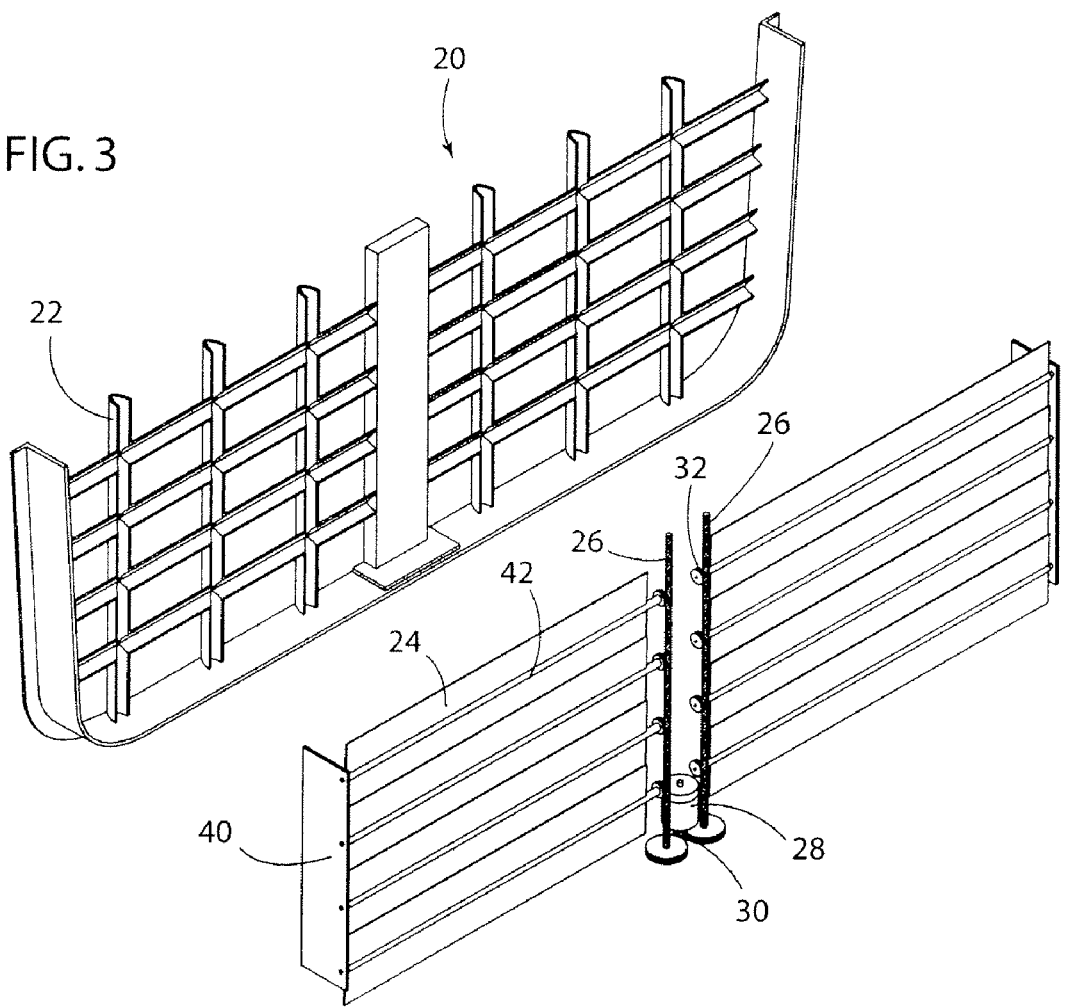
FIG. 3 illustrates a rear perspective view of one embodiment of a variable vehicle grill ventilation system according to the present invention showing a decorative and a louver assembly.
Figure 5:
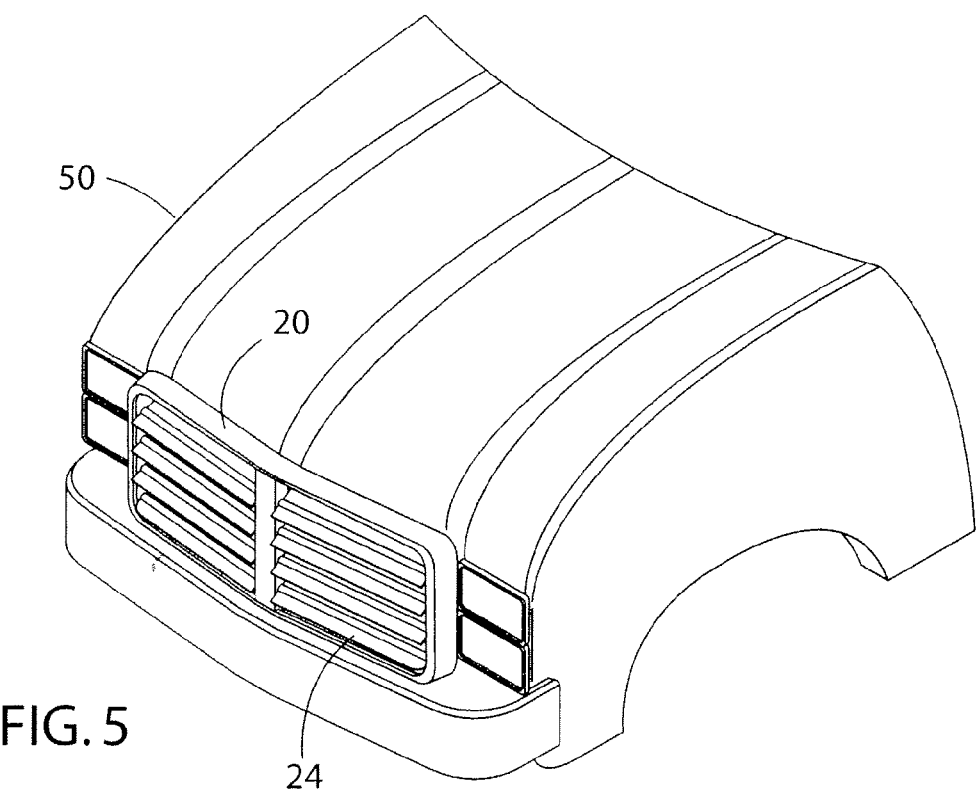
FIG. 5 illustrates a perspective view of an alternate embodiment of the present invention, where the variable vehicle grill ventilation system is integral with the vehicle front end as part of the decorative grill and shown in an open position.

FIGS. 1 through 3 are perspective views showing the configuration of a variable venting front grill generally indicated at 20 in accordance with a preferred embodiment of this invention. FIGS. 4 and 5 are perspective views showing the configuration of a variable venting front grill generally indicated at 20 in accordance with a preferred embodiment of this invention installed on a vehicle 50.

Generally, as shown in FIGS. 1 through 3, the variable venting front grill of this invention can include a decorative grille 22 and a moveable louver assembly 58 (FIG. 2) which are rotatable within a predetermined rotating angle. Helix cables 26 are rotated by motor 28, thus rotating louvers 24 via worm gear connector 32 at each louver 24.

Specifically, as illustrated, louver assembly 58 has horizontal louvers 24 in two separate louver banks, though the invention can be practiced with one louver bank. Further, it should be understood that the louvers 24 may be vertically arranged inside the louver assembly 58. Louvers 24 can be made of a variety of shapes, sizes, and materials known in the art and using sound engineering practices. In one embodiment, louvers 24 are made from sheet aluminum and can be approximately 2 mm thick. Other embodiments can include injection molded plastic, composites, and the like. Louvers 24 can also have a louver rod 42 to provide strength and rotational attachment points. Louver rod can be 8 mm in diameter. Louvers 24 can be rotationally mounted within louver assembly 58 between side bracket 40 and a center bracket 56.

Various gears and helix cables 26 connect louvers 24 to motor 28. Helix cables are known in the art in sunroof applications and, in the present invention, act as a worm drive. Further, helix cables are illustrated for demonstrative purposes only. Threaded rods, worm gears, and the like could also be used to practice this aspect of the invention. In one embodiment, the worm pitch of helix cable 26 can be 2.54 mm/revolution. Motor 28 can be sized according to design specification. One suitable electric motor module is a DC motor currently available from Johnson Electric, headquartered in Hong Kong, as part of their 400 series of motors and frequently used in vehicle sunroof applications. As illustrated, louver rod 42 extends through center bracket 56 and receives a louver pinion gear 32. Louver gear 32 again is commonly used in sunroof applications and is connected to helix cable 26. As such, louver gear 32 is pitched to match helix cable 26 and, in one embodiment, is 15.569 mm pitch diameter and 48.91 mm/revolution circumference, resulting in a ratio of 19.25 helix cable revolution to louver pinion gear.

As illustrated, motor 28 is connected to motor gear 30. Motor gear 30 can be formed from an output shaft of motor 30. In one embodiment, motor gear 30 has a pitch diameter of 11.64 mm. Motor gear 30 connects to helix cable 26 by helix cable drive gear 36 (spur gear). Helix cable drive gear 36 can be made from a variety of materials but, in one embodiment, can be made of plastic over-molded onto helix cable 26. In one embodiment, helix cable drive gear can have a pitch diameter of 31.75 mm. This would result in a ratio of 0.366 helix cable 26 revolution per motor 30 revolution. Combined with the ratios outlined above, a total ratio of 52.5 motor revolution to one louver gear revolution. Thus, open to close position of louvers (i.e., one quarter revolution) would be 13.1 motor 30 revolutions. Directional rotation of the louver assembly 58 is shown at 60.

An advantage of the present moveable louver assembly 58 is that motor 30 is parallel to helix cables 26, thus allowing for a design where the motor does not extend beyond the housing for the louvers. Further, this configuration allows for two sets of louvers to be actuated by the same motor. The result can be that the dual louver banks do not have to be in the same plane, thus allowing angled configurations more typical in vehicle designs with curved front ends.

As illustrated, motor 34 is connected to a power supply and a controller 46. Controller 46 can be packaged between helix cables 36 and can be housed in housing 38. Housing 38 can be made of a variety of materials and connected to center bracket 56. A motor and gear cover 34 can provide further protection. In one embodiment, housing 38 and/or motor and gear cover 34 can be made of milled black plastic, such as Polyoxymethylene (POM), also commonly known under DuPont brand name DERLIN.

For illustrative purposes only, controller 46 can provide various functions, such as activating and deactivating motor 28, and drive it in a clockwise or counter-clockwise rotation. Controller 46 can act in response to commands received through a vehicle communication bus 48, such as a control area network (CAN) or local interconnect network (LIN) bus known in the art. Vehicle communication bus 48 output to controller 46 can be in response to various preprogrammed conditions, such as preset temperature data which is stored in a memory of the unit compared against input from a temperature sensor 52 within an engine's coolant loop. For example, as described below, engine warm-up temperature can be improved through closing louvers 24 during warm-up. The same type of predetermined control could be applied to a vehicle speed sensor 54 as well.

Thus, some advantages of the present configuration over the prior art is that it is infinitely positionable, while having a mechanical advantage of a small motor in line with the helix cables, thus creating a small package. This efficient use of parts and space achieves motor gear reduction for louver rotation. The inline position of the motor leads to improved packaging. The design also allows flexibility to space louvers at different distances and also allows driving two sets of louvers angled to each other, thus allowing better packaging into a curved front end.

In a closed position, the vehicle engine is able to heat up to optimal operating temperatures in less time. In one test, the vehicle heated to optimal operating temperatures 8 to 10 minutes sooner than if the vents were open during idle. Also, as hybrid technology advances, a closed position could also be desirable to retain engine heat during "engine off" status.

Figure 6:
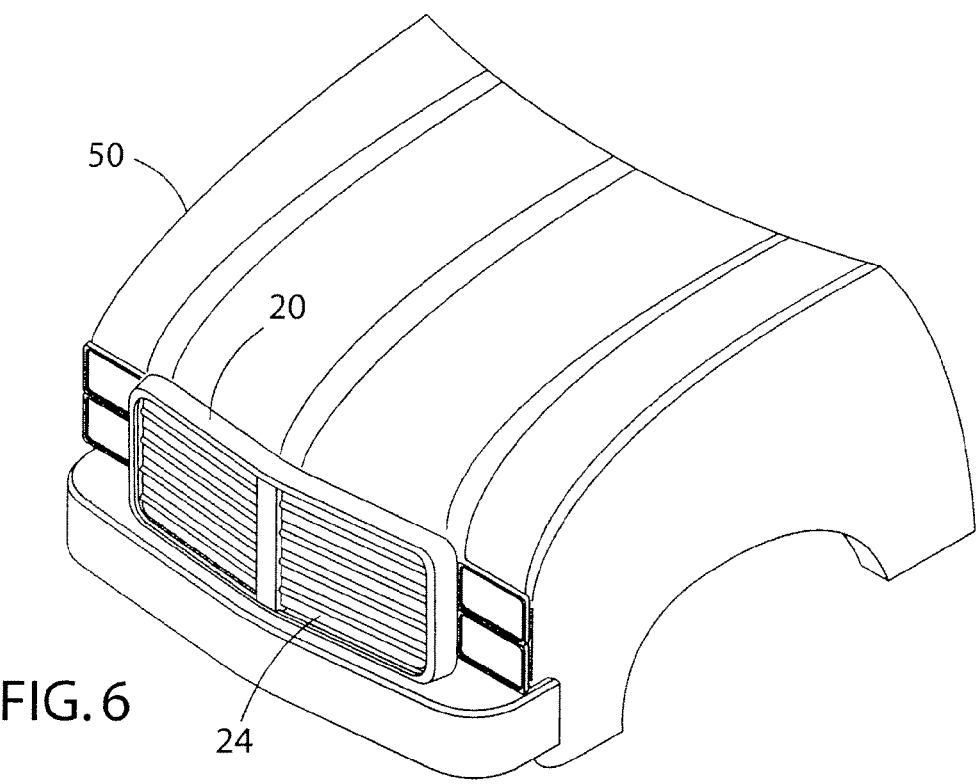
FIG. 6 illustrates a perspective view of an alternate embodiment of the present invention, where the variable vehicle grill ventilation system is integral with the vehicle front end as part of the decorative grill and shown in a closed position.

In an alternate embodiment, such as shown in FIGS. 5 and 6, variable venting front grill system 20 can eliminate the decorative grill 22 portion by configuring the functional louvers 24 to the desired shape of the front end of the vehicle, thus becoming a visible decorative feature of the vehicle front end. In other words, the movable louvers become an integral part of the decorative aspect of the vehicle front end. As shown in FIG. 5 (open position) and FIG. 6 (closed position), this embodiment can provide several advantages, such as the reduction of space, parts, and cost required for the system since the decorative grill 22 portion is eliminated. Further, in a closed position (as shown in FIG. 6), the vehicle becomes more aerodynamic, thus uses less fuel. In one test as shown in the Table below, a pick-up truck prototype had 7 percent lower drag and 15 percent lower lift with the grill vents closed.

TABLE

Coefficients of lift and drag (Moving Floor)

| | Drag coefficient | Lift coefficient |
|---|---|---|
| Case 1: Grill vents closed | 0.5491 | 0.296 |
| Case 2: Grill vents open | 0.5948 | 0.463 |

While the invention has been described in conjunction with specific embodiments, it is evident that many alternatives, modifications, and variations will be apparent to those skilled in the art in light of the foregoing description. Accordingly, the present invention attempts to embrace all such alternatives, modifications, and variations that fall within the spirit and scope of the appended claims.

What is claimed is:

1. A variable venting system for a front end of a vehicle, comprising:
    at least one bank of movable louvers rotatably mounted within a louver frame for guiding flow of air into a vehicle engine compartment;
    means for moving said louvers in opposite directions, comprising a motor connected to a power supply having a motor gear formed on an output shaft rotatably connected in parallel to at least one helix cable by a helix cable drive gear, and a louver pinion gear integral with each louver engaging the helix cable along its length; and
    a control unit for operating the assembly of movable louvers in response to an output signal from a vehicle communication bus.

2. The system of claim 1, further comprising a decorative grill positioned forward of the assembly of movable louvers.

3. The system of claim 1, wherein the assembly of movable louvers is integral with a decorative grill.

4. The system of claim 1, wherein the output signal of the vehicle communication bus is in response to input from an engine coolant temperature sensor.

5. The system of claim 1, wherein the output signal of the vehicle communication bus is in response to input from a vehicle speed sensor.

6. The system of claim 1, further comprising a motor and gear housing.

7. The system of claim 6, wherein the two banks of a movable louvers are in a different plane.

8. The vehicle of claim 7, wherein there are two banks of horizontally positioned movable louvers, each engaged to one of two helix cables, both helix cables driven in parallel by the motor gear.

9. The system of claim 1, wherein there are two banks of horizontally positioned movable louvers, each engaged to one of the two helix cables, both helix cables driven in parallel by the motor gear.

10. The variable venting system for a front end of a vehicle of claim 1, wherein,
    a decorative grill is integral to the louver frame.

11. A vehicle having a variable venting system for a front end of a vehicle, comprising:
    at least one bank of movable louvers rotatably mounted within a louver frame for guiding a flow of air into a vehicle engine compartment;
    means for moving said louvers in opposite directions, comprising a motor connected to a power supply having a motor gear formed on an output shaft rotatably connected in parallel to at least one helix cable by a helix cable drive gear, and a louver pinion gear integral with each louver engaging the helix cable along its length; and
    a control unit for operating the assembly of movable louvers in response to an output signal from a control area network.

* * * * *